United States Patent
Loughran

(10) Patent No.: US 7,185,211 B2
(45) Date of Patent: Feb. 27, 2007

(54) POWER MANAGEMENT IN COMPUTING APPLICATIONS

(75) Inventor: Stephen A. Loughran, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/296,699

(22) PCT Filed: Mar. 28, 2002

(86) PCT No.: PCT/GB02/01562

§ 371 (c)(1), (2), (4) Date: Nov. 27, 2002

(87) PCT Pub. No.: WO02/079957

PCT Pub. Date: Oct. 10, 2002

(65) Prior Publication Data

US 2003/0135769 A1    Jul. 17, 2003

(30) Foreign Application Priority Data

Mar. 28, 2001    (GB) .................................. 0107787.4

(51) Int. Cl.
*G06F 1/26* (2006.01)
*G06F 1/32* (2006.01)

(52) U.S. Cl. ...................... 713/300; 713/320
(58) Field of Classification Search ................. 713/300, 713/320
See application file for complete search history.

(56) References Cited

U.S. PATENT DOCUMENTS

| | | | |
|---|---|---|---|
| 5,630,148 A | 5/1997 | Norris | |
| 5,657,438 A * | 8/1997 | Wygodny et al. | 714/1 |
| 5,682,273 A | 10/1997 | Hetzler | 360/75 |
| 5,944,829 A | 8/1999 | Shimoda | |
| 5,958,058 A | 9/1999 | Barrus | |
| 5,978,923 A | 11/1999 | Kou | |
| 6,006,335 A | 12/1999 | Choi et al. | |
| 6,185,677 B1 | 2/2001 | Nijhawan | |
| 6,308,146 B1 * | 10/2001 | La Cascia et al. | 703/22 |
| 6,418,535 B1 * | 7/2002 | Kulakowski et al. | 713/320 |
| 6,457,135 B1 * | 9/2002 | Cooper | 713/323 |
| 6,535,798 B1 * | 3/2003 | Bhatia et al. | 700/293 |
| 6,603,469 B1 * | 8/2003 | Gettemy et al. | 345/211 |
| 6,910,139 B2 * | 6/2005 | Ishidera | 713/320 |

FOREIGN PATENT DOCUMENTS

| | | |
|---|---|---|
| EP | 0990977 A1 | 4/2000 |
| EP | 1 115 054 A2 | 7/2001 |
| WO | WO 93/07558 | 4/1993 |

OTHER PUBLICATIONS

Phoenix Technologies, http://www.phoenix.com/en/customer+services/bios+support/applications/powerpanel+fa
Symantec Mobile Essentials 2.5, Product Specifications, www.symantec.com/mobileesentials.

* cited by examiner

*Primary Examiner*—Thomas Lee
*Assistant Examiner*—Ji H. Bae

(57) ABSTRACT

Power consumption of software applications on a computing device is managed in accordance with a plurality of defined power management states. User selectable features for one or more software applications are identified, and choices for these user selectable features defined for each power management state. When the active power management state changes, the choice of each user selectable feature for that power management state is then imposed on the relevant software applications on the computing device.

38 Claims, 3 Drawing Sheets

POWER MANAGEMENT IN COMPUTING APPLICATIONS

RELATED APPLICATIONS

The present application is a national phase application of PCT/FB2002/01562, filed Mar. 28, 2002, which claims priority to British Application Serial Number 0107787.4, filed Mar. 28, 2001, the disclosures of which are hereby incorporated by reference herein in their entirety.

FIELD OF THE INVENTION

The present invention relates to power management in computing applications. The invention is particularly relevant to computing devices adapted to operate in a plurality of locations, particularly mobile computing devices (including, but not limited to, notebook computers, pocket computers, and personal digital assistants).

DESCRIPTION OF PRIOR ART

Power management is a critical issue for mobile computing devices, particularly those that consume significant power, such as notebook computers.

It is known to provide some types of power management tool in a notebook computer device. The simplest example, generally provided, is to provide different power management dependent on power source (specifically as to whether the power source is the mains or a battery). Operating systems for such devices do further address power management issues. For example, Microsoft Windows 2000 provides a range of user-selectable power options, providing monitor, hard disk and standby options for mains and battery operation.

An example of a more sophisticated power management tool is Phoenix PowerPanel 3.0, a product of Phoenix Technologies Ltd. used in the Sony Vaio notebook computer, which adjusts system power management policies based on the currently active application. Phoenix PowerPanel (which is further described at http://www.phoenix.com/platform/powerpanel.html) provides for different application types a power profile consisting of power management settings optimised for the application type. The user also has the option of selecting which power profile is to be used (rather than relying on autodetection by PowerPanel of the application type of the active application).

It would be desirable to find other approaches to improve yet further power management in mobile computing devices.

SUMMARY OF INVENTION

The invention therefore provides a method of managing power consumption of software applications on a computing device, comprising: determining a plurality of power management states for the computing device; identifying user selectable features of one or more software applications and holding selection choices for said user selectable features for a plurality of power management states; and recognising a change of power management state, and imposing the selection choice of the user selectable features on software applications on the computing device for the new power management state.

In a further aspect, the invention provides a data structure adapted for power management of applications on a computing device, comprising: a database identifying user selectable features of one or more software applications and holding selection choices for said user selectable features for a plurality of power management states; and an executable structure such that on input of a change of power management state, the executable structure controls software applications on the computing device to impose the selection choice of user selectable features for the new power management state.

Use of such a data structure—preferably embodied as an application resident and active on the computing device—enables power management in applications to be achieved without user intervention. Features which are user selectable can be enabled or disabled according to the requirements of the new power management state (or if not critical to the new power management state, the user's normal preference can be reinstated).

Such a data structure may impose the selection choice for the new power management state on active applications, and may also ensure that newly booted applications apply the selection choice on startup. The selection choice may be imposed by a macro appropriate to the relevant application, by spoof user input, or by altering an initialisation file or registry.

In a further aspect, the invention provides a computing device programmed to manage power consumption of software applications, the computing device comprising: a memory storing an identification of user selectable features of one or more software applications and storing selection choices for said user selectable features for a plurality of power management states; and a processor programmed such that on input of a change of power management state, the executable structure controls software applications on the computing device to impose the selection choice of user selectable features for the new power management state.

DESCRIPTION OF FIGURES

Embodiments of the invention will be described below, by way of example, with reference to the accompanying drawings, of which.

SPECIFIC EMBODIMENTS OF THE INVENTION

Figure 1:
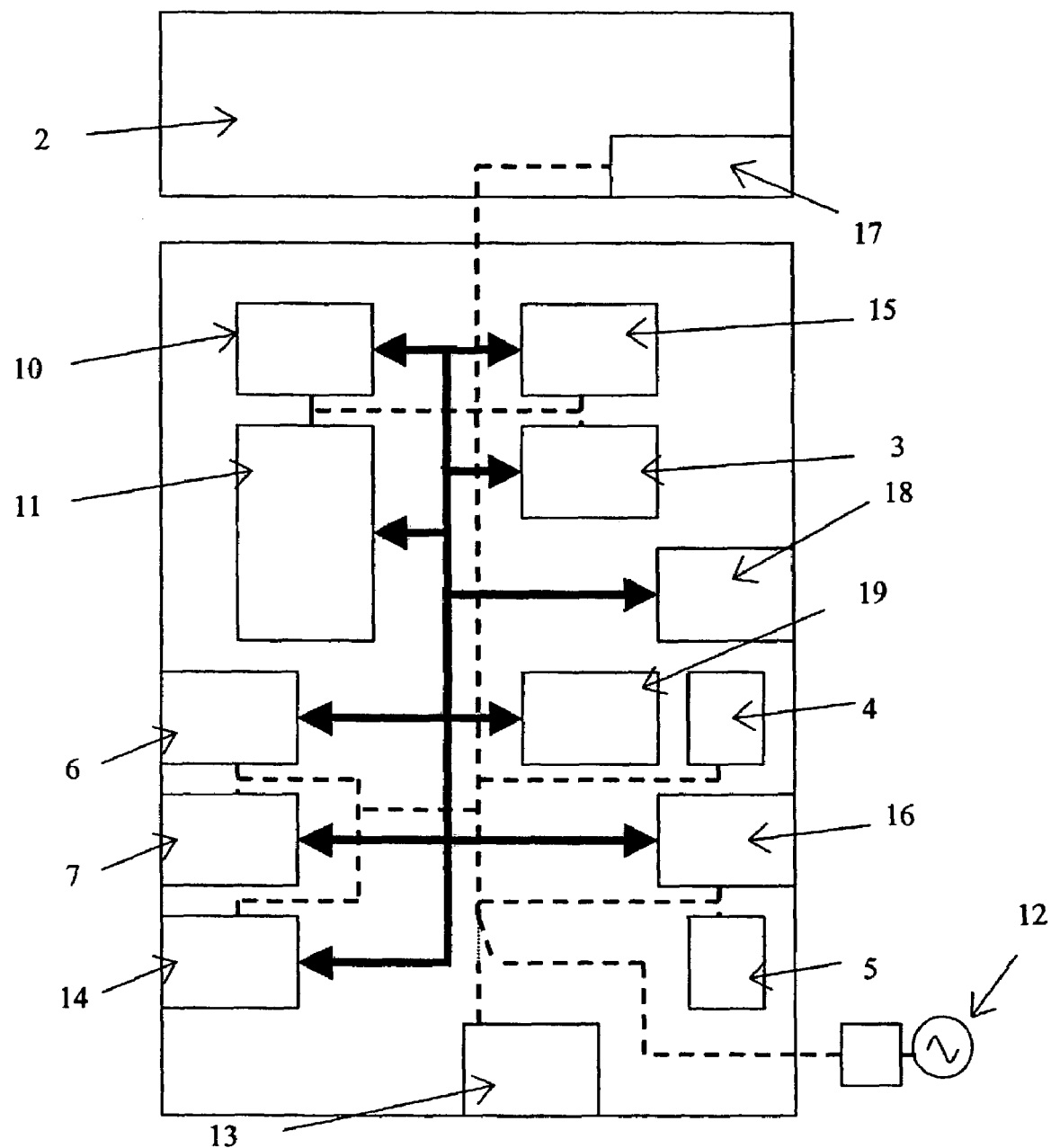
FIG. 1 shows a schematic view of a notebook computer suitable for use with aspects of the invention.

FIG. 1 shows a schematic view of a notebook computer suitable for use with aspects of the present invention. As will be appreciated by those skilled in the art, the present invention can be applied to any conventional architecture of notebook computer.

Notebook computer 1 comprises a CPU 10 and a memory 11 (shown here for convenience as one schematic element, but which typically consists of a RAM main memory, a ROM holding BIOS and other code required at startup, and a RAM cache), which holds the operating system of the computer and also applications available for execution by the computer. The notebook computer 1 is adapted to be powered by a battery 13 for at least a part of the time, so power conservation is a relevant concern. The remainder of the time, the notebook computer may be powered by the mains 12 (alternatively or additionally, the mains connection will generally be used to power the battery 13).

Components of the notebook computer 1 that consume significant power are shown in FIG. 1. CPU 10 consumes significant power in normal use, and may consume more power when applications make heavy processing demands. The display 2 also consumes significant power—the screen backlight 17 is a major consumer of power, and power will also be consumed by the graphics adapter 15 providing the signal for the display 2. Disk drives (such as hard disk drive 4 and floppy disk drive 5, controlled through disk drive controller 16) also consume significant power. Other power consumers may be the various input/output devices (keyboard, mouse etc.) 18 associated or integrated with the notebook computer, and a network adapter 14 to allow the notebook computer 1 to connect to networks. A serial interface 6 (through which a modem may be connected—if, as normal, this is internal to the computer this may be a significant consumer of power) and a parallel interface 7 are shown for completeness as normal system elements.

Also shown in FIG. 1 are power management switches 19. These typically include a lid switch, which turns off the display and (typically) moves the notebook computer 1 to a sleep state, and a user switch, normally used to turn on the computer or to cause the computer to enter a suspend state.

Also shown in FIG. 1 is a location detection element 3. This location detection element may be achieved by one of a variety of alternative possibilities, such as a GPS receiver, a cellphone connection to the GSM PLMN (Public Land Mobile Network), short range wireless or infrared beacons. The significance of location detection elements in power management is described in greater detail in the applicant's copending British Patent Application of even date entitled "Context-Dependent Operation Of Mobile Computing Devices".

A typical notebook computer or other mobile computing device will be equipped with a number of computing applications—most typically, a notebook computer will be loaded with a suite of productivity software (such Microsoft Office or Lotus Smartsuite) containing for example a word processor, a spreadsheet, presentation software and e-mail software. Each such application contains a vast number of features that are not fundamental to the operation of the application—many of these are user selectable or deselectable (in that they are present in the default version of the application but can be deselected by the user).

A number of these features consume significant power, whether in CPU time or otherwise. When power conservation is significant, such as in mobile operation, it is desirable to disable some or all such features where they do not impact the user's use of the application significantly. A user can do this manually while using the application, but this is inefficient, time consuming, and detracts significantly from the user experience.

Aspects of the present invention provide a mechanism for achieving effective power management in applications without user intervention (except, perhaps, to override automatically made power management choices where required). A first step is to define a plurality of power management states for the computing device. There may simply be two: a "normal" state where no power management is applied and an "economy" state where power management is imposed so that all active applications are as economical in power use as possible. This approach could be applied such that the "normal" state operated with mains power provided to the computing device and the "economy" state operated with battery power applied (or perhaps both battery power and a charge level below a specified threshold). More complex regimes are possible: a "light economy" state could be used for battery power above the threshold (in which only less useful power hungry features where disabled—such as animation) or states could be defined that allowed unrestricted feature use in some applications but limited it in others (for example, a "presentation" state optimising use of presentation applications but limiting power consumption by other applications).

These power management states may for example be determined by a user context—such as use at the user's normal office, at home, in a meeting, or during travel. Determination of such contexts is discussed in the applicant's copending application of even date entitled "Context-Dependent Operation Of Mobile Computing Devices", the contents of which are incorporated by reference herein.

Embodiments of the invention provide that features of software applications that are not essential to proper function of the applications, but consume significant power, can be disabled in appropriate power management states. This is only possible if there is some mechanism by which the relevant application features can be selected or deselected. However, if a feature can be selected or deselected within the application by a user, it will generally be possible for such a feature to be controlled automatically without user intervention, as is discussed below.

For each relevant software application, it is then necessary to compile a list of all selectable features that it is desired to vary between at least some of the power management states. For each application feature, it is necessary to identify the feature, how a selection can be made for that feature from outside the application, and a selection choice for that feature in each power management state. Table 1 shows an exemplary list for one application: Microsoft Word in Microsoft Office 2000.

TABLE 1

Exemplary feature selection table for Microsoft Word (Office 2000)

| Feature | Control Method | Normal State | Deep Economy State | Light Economy State |
|---|---|---|---|---|
| Animations | Add-In "Sel_anim" | Select | Deselect | Deselect |
| Spelling Check While Typing | Add-In "Sel_spel" | User default | Deselect | User default |
| Grammar Check While Typing | Add-In "Sel_gram" | User default | Deselect | Deselect |

In this case, there are three power management states: a normal state, a light economy mode (for example, battery operation but above a threshold charge state) and a deep economy state (where there is battery operation below a threshold charge state). Animations (such as the animated Office Assistant) are enabled when the computing device is in the normal state, but are disabled in both economy states. The spelling checker—a significant consumer of power—is allowed to operate while typing if this is the user's normal selected preference (as will be provided to the program in its initiation file) but not otherwise: in other words, the user's preference will not be overridden in normal state. This also applies to the light economy state, but in the deep economy state this feature will be disabled. For grammar checking during typing, the user's normal choice will be unaffected for the normal state, but in either economy state this feature will be disabled.

At least three different types of control method can be employed. A first type, as identified in the table above, is provision of a macro in a macro language appropriate to the application. This is particularly appropriate to Microsoft productivity software, for example. Macros can be written through the appropriate API—for example, for Microsoft Office the Add-In library can be used (accessed in the application through "Templates and Add-Ins" on the Tools menu) and Add-Ins provided that will make the appropriate selection. Care is needed to ensure that if the relevant application is not currently active, it will not be started simply to apply the selection choice for the new power management state—this could be achieved by ensuring that that unless the application is currently active, the macro will not be applied until the application is booted. For a Microsoft operating system, such Add-Ins will typically work by OLE Automation and COM method calls—other operating systems will have a different mechanism (for Java, Java Remote Method Invocation (RMI) may be employed) but the principles are similar and the skilled person will understand how these can be applied for a given operating system and application.

A second type of control method is simulation of user input to a program. The simplest way to achieve this is generally by simulation of a user menu selection—easy to do, because the menu definition is typically provided by the operating system. This means that once it is determined which features of an application are changed by user activation of a menu item, appropriate menu item choices can be simulated. This determination of the necessary menu item calls is likely to require at most analysis of the application with a debug tool, but has the disadvantage that each time the menu options for the application change (probably with each version of the application), it will be necessary to rebuild the user input simulation choices for that application.

A third type of control method is to change the initialisation file or registry information that the application must access on startup. This may be the simplest to achieve, but does not fit well with the application being active throughout the power management state change. This may be a particularly suitable choice for certain operating environments (such as Unix, for example).

Different control methods could be used for different applications (for example, macros could be used for Microsoft Office applications and simulated user input for other applications). Another possibility is to use a different control method depending on whether or not an application is active (as can readily be detected) at the time of a state change—for example, if the application is active, the feature selection could be made by macro or simulated user input, but if the application is inactive, the initialisation file could be changed (this would be another way to prevent a macro from starting the application simply to apply power management options).

Figure 2:
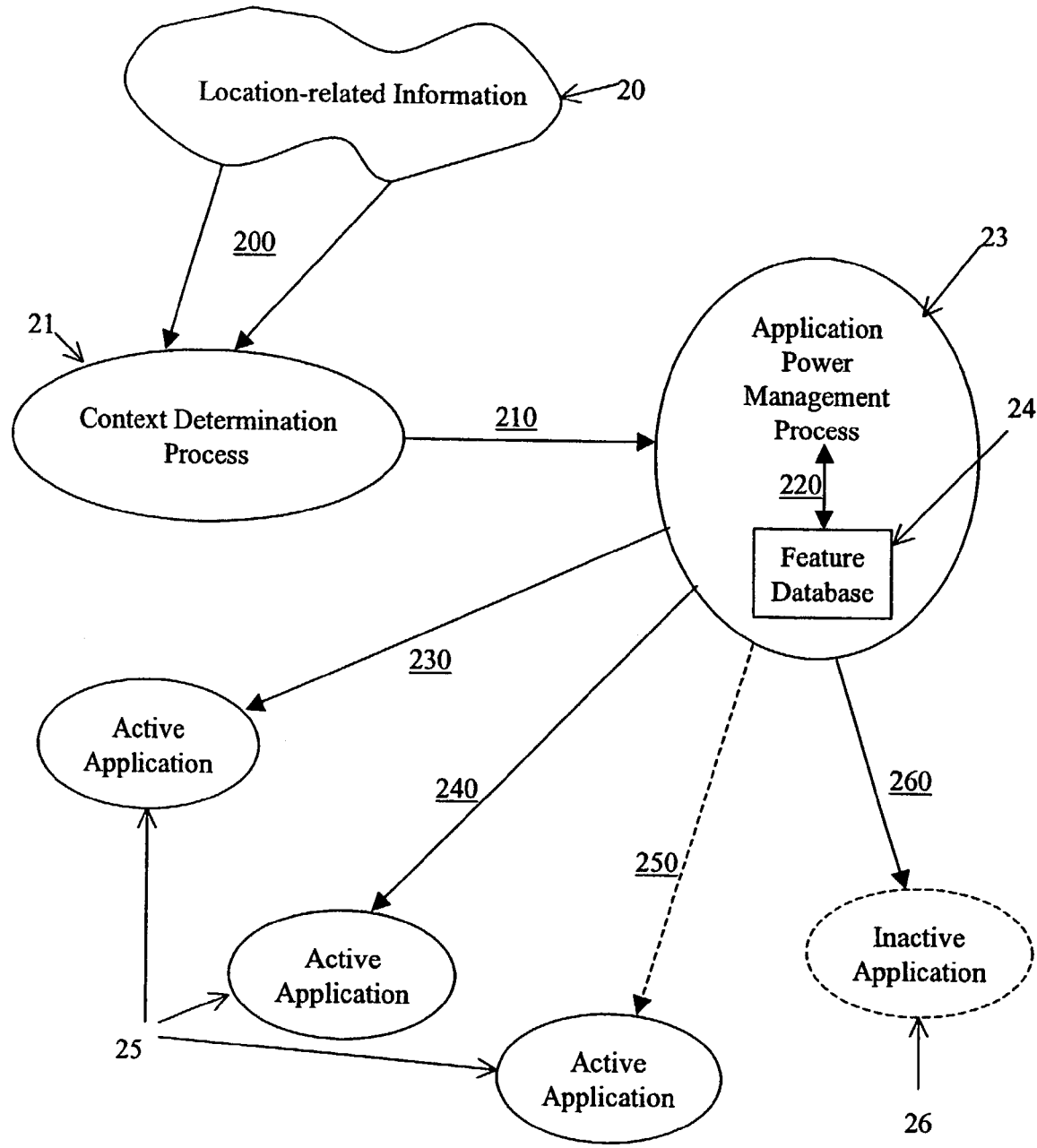
FIG. 2 shows a schematic view of the processes used in an embodiment of the present invention and their interaction.
Figure 3:
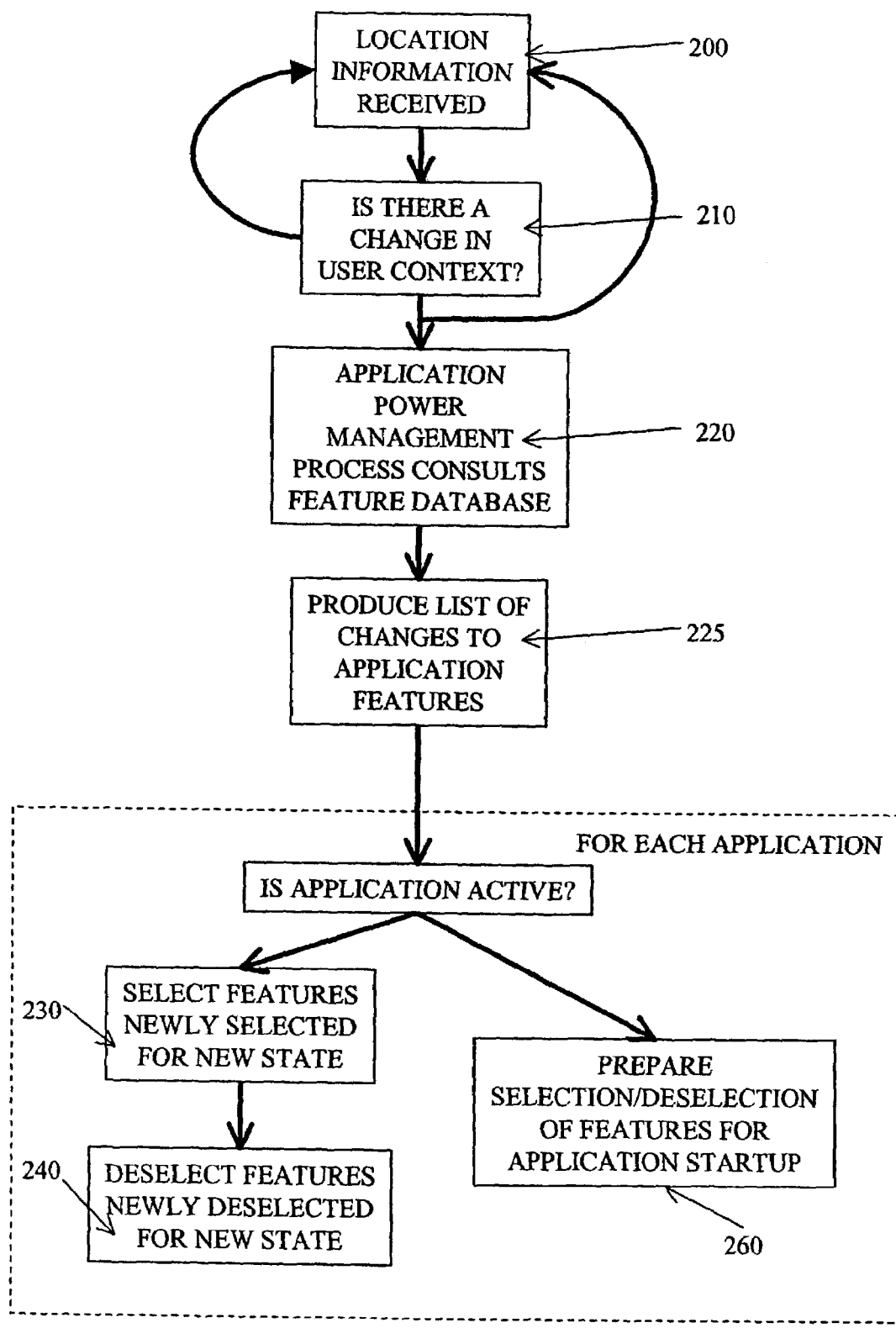
FIG. 3 shows a flow diagram for the embodiment shown in FIG. 2.

FIG. 2 shows the application of an embodiment of the invention in terms of the processes operating on the computing device—FIG. 3 shows a flow diagram illustrating the same process. In this embodiment, power management is in accordance with a determined user context (as described above), though it should be appreciated that other embodiments of the invention do not require a user context but can operate to a simple rule (such as failing below a battery charge threshold). Location-related information 20 is received, either from a regular polling step or by a trigger event (step 200) by a context determination process 21 which determines a current user context. When this user context changes the application power management process 23 is advised (step 210) of the new power management state. The application power management process then consults (step 220) its feature database 24 to determine (step 225) what changes to application features are required for the new power management state. Where the application is active, such as applications 25, features may be selected (step 230) or deselected (step 240) according to any of the control methods indicated above, or no change may be made (250). Preferably, the applications are first checked to determine the present state of any features to be changed so that redundant instructions are not issued. Where applications are inactive (such as application 26), the feature selection or deselection may be prepared (step 260) for activation when the inactive application is next booted.

It is desirable for the user to be able to override power management feature choices temporarily—if the control step takes place only on change of power management state, this can be achieved trivially within a single power management state by the user simply changing the feature within the relevant application. However, it may be desirable to preserve the user's positive selection of this feature across a subsequent change of state, in which case a user change of a feature managed by the application power management process may be noted and preserved across changes of power management state in the same user session. It is also desirable for there to be a user interface to the application power management process, allowing user control of which features can be changed by the application power management process (and how these features can be changed)—where power management state is an aspect of user context, this may be achieved as part of an application which determines a range of power management options and user settings for specific user contexts.

The invention claimed is:

1. A method of managing power consumption of software applications on a computing device having a plurality of power management states, comprising:
   identifying one or more user selectable features of one or more software applications and holding a selection choice for each of said one or more user selectable features for the plurality of power management states;
   recognizing a change of power management state from an old state to a new state, and imposing the selection choice for each of said one or more user selectable features on at least one of the one or more software applications on the computing device for the new power management state,
   wherein imposing the selection choice comprises providing an input to a particular software application from an executable structure outside of the particular software application; and
   wherein the executable structure that imposes the selection choice provides the input to the particular software application in a macro language appropriate to the particular software application.

2. A method as claimed in claim 1, wherein the selection choice for each of said one or more user selectable features is imposed on software applications active at the change of power management state.

3. A method as claimed in claim 1, wherein the selection choice for each of said one or more user selectable features is imposed on software applications as they become active at the change of power management state.

4. A method as claimed in claim 1, wherein the macro language input to the particular software application is not made until the particular software application is activated.

5. A method as claimed in claim 1, wherein the input for the particular software application is provided in information accessed by the particular software application in response to start up of the particular software application.

6. A method as claimed in claim 1, wherein at least one of said one or more user selectable features includes a feature normally enabled during operation of the particular software application but which can be disabled by the user.

7. A method as claimed in claim 1, wherein a valid selection choice for at least one of said one or more user selectable features is to retain a normal user default selection for that feature.

8. A method of managing power consumption of software applications on a computing device having a plurality of power management states, comprising:
  identifying one or more user selectable features of one or more software applications and holding a selection choice for each of said one or more user selectable features for the plurality of power management states;
  recognizing a change of power management state from an old state to a new state, and imposing the selection choice for each of said one or more user selectable features on at least one of the one or more software applications on the computing device for the new power management state,
  wherein imposing the selection choice comprises providing an input to a particular software application from an executable structure outside of the particular software application; and
  wherein the executable structure that imposes the selection choice provides the input to the particular software application as simulated user input.

9. A method as claimed in claim 8, wherein the simulated user input is provided by activation of a menu item of the particular software application.

10. A method as claimed in claim 8, wherein the selection choice for each of said one or more user selectable features is imposed on software applications active at the change of power management state.

11. A method as claimed in claim 8, wherein the selection choice for each of said one or more user selectable features is imposed on software applications as they become active in the new power management state.

12. A method as claimed in claim 8, wherein input for the particular software application is provided in information accessed by the particular software application in response to start up of the particular software application.

13. A method as claimed in claim 8, wherein at least one of said user selectable features includes a feature normally enabled during operation of the particular software application but which can be disabled by the user.

14. A method as claimed in claim 8, wherein a valid selection choice for at least one of said user selectable features is to retain a normal user default selection for that feature.

15. A computer readable medium having recorded thereon a computing device readable data structure adapted for power management of applications on a computing device, comprising:
  a database identifying one or more user selectable features of one or more software applications and holding a selection choice for each of said one or more user selectable features for a plurality of power management states; and
  an executable structure such that on input of a change of power management state from an old state to a new state, the executable structure is arranged to control the one or more software applications on the computing device and to impose the selection choice for each of said one or more user selectable features for the new power management state, the executable structure being further arranged to impose by providing an input to a particular software application from a source outside the particular software application,
  wherein the executable structure is arranged to provide the input to the particular software application in a macro language appropriate to the particular software application.

16. A computer readable medium as claimed in claim 15 for causing the executable structure to act on currently active software applications.

17. A computer readable medium as claimed in claim 15 for causing the executable structure to act on software applications as they become active in the new power management state.

18. A computer readable medium as claimed in claim 15, wherein the executable structure is adapted to prevent provision of the macro language input to the particular software application until the particular software application is activated.

19. A computer readable medium as claimed in claim 15, wherein the input for the particular software application is arranged to be provided in response to information accessed by the particular software application in response to start up of the particular software application.

20. A computer readable medium as claimed in claim 15, wherein at least one of said one or more user selectable features is a feature normally enabled during operation of the particular software application but which can be disabled by the user.

21. A computer readable medium as claimed in claim 15, wherein a valid selection choice for at least one of said one or more user selectable features is to retain a normal user default selection for that feature.

22. A computer readable medium having recorded thereon a computing device readable data structure adapted for power management of applications on a computing device, comprising:
  a database identifying one or more user selectable features of one or more software applications and holding a selection choice for each of said one or more user selectable features for a plurality of power management states; and
  an executable structure such that on input of a change of power management state from an old state to a new state, the executable structure is arranged to control the one or more software applications on the computing device and to impose the selection choice for each of said one or more user selectable features for the new power management state, the executable structure being further arranged to impose by providing an input to a particular software application from a source outside the particular software application,
  wherein the executable structure is arranged to provide simulated user input to the particular software application.

23. A computer readable medium as claimed in claim 22, wherein the simulated user input is arranged to provide activation of a menu item of the particular software application.

24. A computer readable medium as claimed in claim 22 for causing the executable structure to act on currently active software applications.

25. A computer readable medium as claimed in claim 22 for causing the executable structure to act on software applications as they become active in the new power management state.

26. A computer readable medium as claimed in claim 22, wherein the input for the particular software application is arranged to be provided in response to information accessed by the particular software application in response to start up of the particular software application.

27. A computer readable medium as claimed in claim 22, wherein at least one of said one or more user selectable features is a feature normally enabled during operation of the particular software application but which can be disabled by the user.

28. A computer readable medium as claimed in claim 22, wherein a valid selection choice for at least one of said one or more user selectable features is to retain a normal user default selection for that feature.

29. A computing device for managing power consumption of software applications, the computing device comprising:
 a memory storing an identification of one or more user selectable features of one or more software applications, a selection choice for each of said one or more user selectable features for a plurality of power management states, and an executable structure arranged to control said one or more software applications; and
 a processor arranged such that in response to input of a change of power management state from an old state to a new state, the executable structure is arranged to control one of the one or more software applications on the computing device to impose the selection choice for each of said one or more user selectable features for the new power management state, the executable structure being arranged for providing an input to a particular software application from a source outside the particular software application, wherein the executable structure is arranged to provide the input to the particular software application in a macro language appropriate to the particular software application.

30. A computing device as claimed in claim 29, wherein the processor is programmed to detect the change of power management state.

31. A computing device as claimed in claim 29, wherein the processor is programmed to allow user input of the change of power management state.

32. A computing device as claimed in claim 29, such that the processor is arranged for causing the selection choice for each of said one or more user selectable features to be imposed on currently active software applications.

33. A computing device as claimed in claim 29, such that the executable structure is arranged to act on software applications as the software applications become active in the new power management state.

34. A computing device for managing power consumption of software applications, the computing device comprising:
 a memory storing an identification of one or more user selectable features of one or more software applications, a selection choice for each of said one or more user selectable features for a plurality of power management states, and an executable structure arranged to control said one or more software applications; and
 a processor arranged such that in response to input of a change of power management state from an old state to a new state, the executable structure is arranged to control one of the one or more software applications on the computing device to impose the selection choice for each of said one or more user selectable features for the new power management state, the executable structure being arranged for providing an input to a particular software application from a source outside the particular software application,
 wherein the executable structure is arranged to provide simulated user input to the particular software application.

35. A computing device as claimed in claim 34, wherein the processor is programmed to detect the change of power management state.

36. A computing device as claimed in claim 34, wherein the processor is programmed to allow user input of the change of power management state.

37. A computing device as claimed in claim 34, such that the processor is arranged for causing the selection choice for each of said one or more user selectable features to be imposed on currently active software applications.

38. A computing device as claimed in claim 34, such that the executable structure is arranged to act on software applications as the software applications become active in the new power management state.

* * * * *